United States Patent [19]

Cornelius et al.

[11] 4,045,960

[45] Sept. 6, 1977

[54] PROCESS FOR PRODUCING ENERGY

[75] Inventors: Gerhard Cornelius, Bergen-Enkheim; Friedemann Marschner, Oberursel; Emil Supp, Dietzenbach; Toma Varlam, Neu-Isenburg, all of Germany

[73] Assignee: Metallgesellschaft Aktiengesellschaft, Frankfurt am Main, Germany

[21] Appl. No.: 647,965

[22] Filed: Jan. 9, 1976

[30] Foreign Application Priority Data

Jan. 15, 1975   Germany .............................. 2501377

[51] Int. Cl.[2] ............................................ F01K 17/00
[52] U.S. Cl. ........................................ 60/648; 60/651
[58] Field of Search ...................... 290/2; 60/648, 651, 60/671

[56] References Cited

U.S. PATENT DOCUMENTS

| 1,583,621 | 5/1926 | Steinberg | 290/2 |
| 2,303,381 | 12/1942 | New | 290/2 |
| 3,296,449 | 1/1967 | Plust et al. | 290/2 |
| 3,928,973 | 12/1975 | Hand | 60/648 |
| 3,959,972 | 6/1976 | Rudolph et al. | 60/648 |

*Primary Examiner*—Robert K. Schaefer
*Assistant Examiner*—Eugene S. Indyk
*Attorney, Agent, or Firm*—Burgess, Dinklage & Sprung

[57] ABSTRACT

The sensible heat contained in exhaust gases formed in chemical reactions is utilized to produce energy. The exhaust gas is conducted as a counterflow to the product gas and is heated and expanded with the performance work.

5 Claims, 2 Drawing Figures

PROCESS FOR PRODUCING ENERGY

BACKGROUND

This invention relates to a process of producing or recovering energy, particularly of producing electric energy, by the utilization of the pressure and heat potentials of exhaust gases formed in chemical syntheses, particularly in the synthesis of methanol.

Many chemical reactions result in exhaust gases, which cannot be utilized further or which would have to be purified at high expense before their further utilization. These exhaust gases often contain sensible heat, which is lost, as a rule.

It has already been proposed to recover heat in chemical processes, e.g., in the synthesis of methanol.

German Pat. No. 2,013,297 describes a process in which the reaction heat is utilized which is generated when methanol is produced from a synthesis gas which contains carbon oxides and hydrogen and which has been produced by a cracking of hydrocarbons by a treatment with water vapor on an indirectly heated, nickel-containing catalyst at temperatures above 700° C, and which synthesis gas is reacted on a copper-containing catalyst under pressures of 30–80 kg/cm² and at temperatures of 230°–280° C. The latter catalyst is contained in tubes which are indirectly cooled with water with production of high-pressure steam. The resulting high-pressure steam can be expanded to a back-pressure of 4–6 kg/cm² with performance of work, and the remaining low-pressure steam may be used to supply heat to the final distillation of the methanol which has been produced.

Some syntheses involve a formation of exhaust gases which contain not only sensible heat but are under the pressure under which the synthesis has been effected. This pressure may amount, e.g., in the synthesis of methanol, to 200 bars (German Pat. No. 1,668,390) and has not yet been utilized for a production of energy.

SUMMARY

This invention utilizes the sensible heat contained in the exhaust gases formed in such and similar reactions as well as the energy which is due to the existing pressure. For instance, in the synthesis of methanol, the sensible heat and the pressure energy of the exhaust gas and the sensible heat of the product gas, which is the gas leaving the synthesis reactor, have not been utilized in the lower temperature region but have been transferred to the air or cooling water. It is also an object of the invention to improve the economy of chemical syntheses and to reduce the cost of the resulting end product in that energy is produced or recovered from exhaust gases which are worth-less otherwise.

This is accomplished according to the invention in that the exhaust gas is conducted as a counterflow to the product gas and is heated and then expanded with performance of work.

DESCRIPTION OF THE DRAWING

The invention is illustrated by way of example in the diagrammatic drawings and will be described more fully hereinafter.

DESCRIPTION

Figure 1:
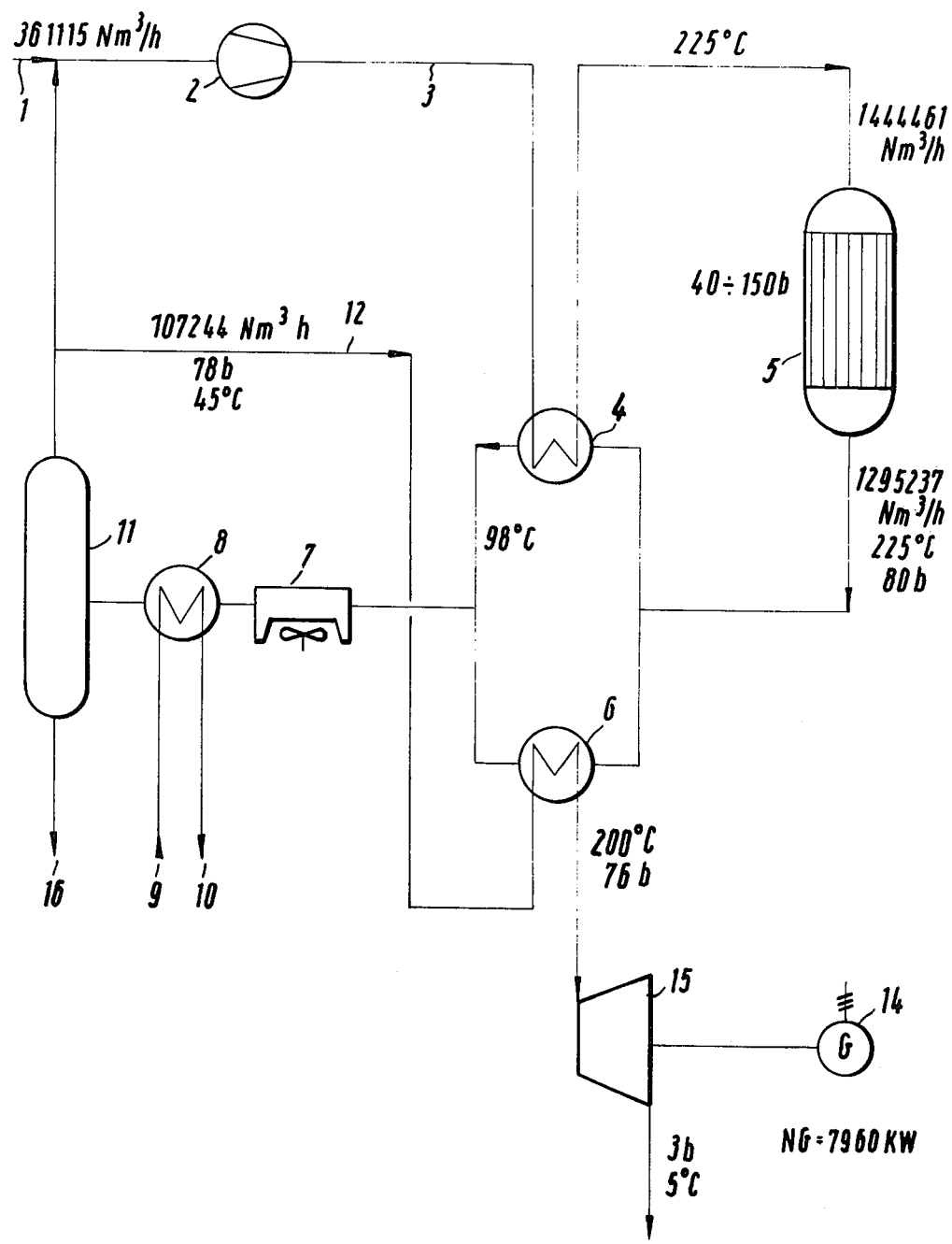
FIG. 1 is a flow diagram of one embodiment of the process according to the invention.
Figure 2:
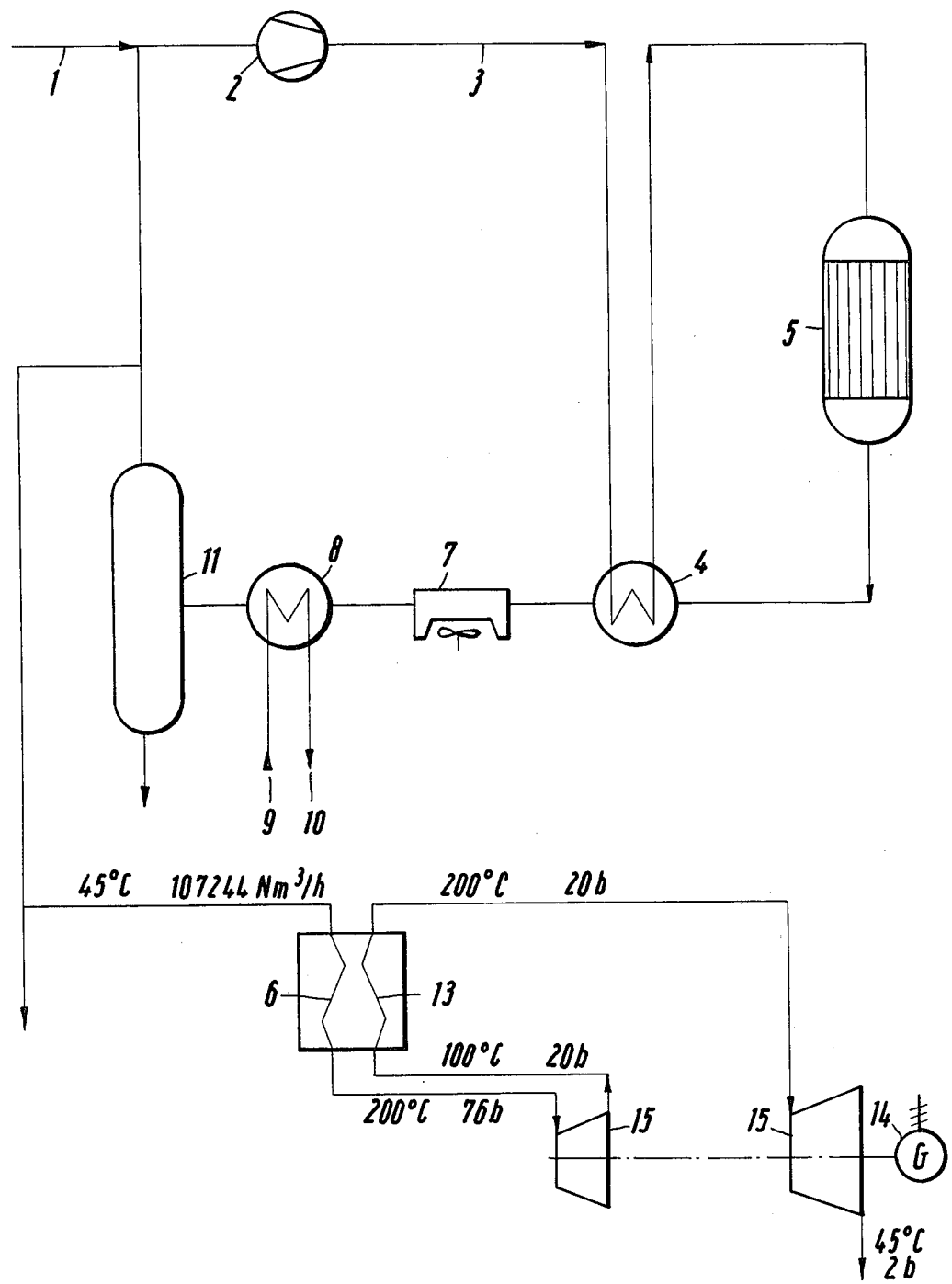
FIG. 2 is a flow diagram of another embodiment of the process according to the invention.

Accordance with a preferred feature of the invention, the exhaust gas is partly expanded with performance of work and is then re-overheated as a counterflow to the product gas and is subsequently expanded further.

According to a preferred feature of the invention, the exhaust gas is heated by extraneous heat. This extraneous heat may consist of the waste heat from other chemical processes or plants, or the exhaust gas may be heated in a manner known per se in a furnace.

The advantages afforded by the invention reside particularly in that the sensible heat and/or the pressure of exhaust gases formed in chemical processes, such as catalytic reactions of gases which contain CO, $CO_2$, and $H_2$, are utilized for a production of energy.

The invention is applicable to all chemical syntheses in which exhaust gases are formed, particularly to the synthesis of methanol. It makes no difference from which raw material the methanol is produced. In the process according to the invention, solid fuels, such as coal, may be used, or liquid fuels, such as hydrocarbon oils, gasolines, and the like, or gaseous raw materials, such as natural gas or suitable synthesis gases. The process is simple and inexpensive and does not require any or any substantial supervision. It is particularly desirable in conjunction with processes in which exhaust gases are formed at high rates.

In the drawings, 1 designates the fresh gas inlet, 2 the compressor for recycled gas, 3 a conduit for recycled gas, 4 the heat exchanger for the recycled synthesis gas and the product gas, 5 the methanol synthesis reactor, 6 an exhaust gas preheater, 7 an air cooler, 8 a final cooler with an inlet 9 and an outlet 10 for the coolant, 11 a methanol separator, 12 an exhaust gas conduit, 13 another exhaust gas preheater, 14 a generator, 15 an expansion turbine, and 16 an outlet for raw methanol.

EXAMPLE 1

In accordance with FIG. 1, fresh gas for the synthesis of methanol is supplied at 1. This gas may be produced by a suitable treatment of coal, naphta, natural gas, etc. In the following example the fresh gas is produced from a natural feed gas in a steam reforming plant, and has the following constituents in % by volume:

| | |
|---|---|
| $CO_2$ | 7.13 |
| CO | 15.77 |
| $H_2$ | 72.70 |
| $CH_4$ | 4.30 |
| $N_2$ | 0.10 |

At the outlet of the steam reforming plant, the fresh gas is under a pressure of 5–40 bars. The fresh gas is compressed by means of a compressor to the reaction pressure required for the methanol synthesis, in the present case to about 80 bars. A compressor 2 for recycled gas is operated to maintain an optimum ratio in the present case preferably 3:1, of recycled gas to fresh gas. This recycled gas is fed through 3 into the heat exchanger 4 and in the latter is conducted as a counterflow to the product gas and is thus heated to the temperature of 190°–280° C required at the inlet of the methanol synthesis reactor 5. In the latter, CO, $CO_2$ and $H_2$ are partly reacted to methanol.

The product gas leaving the methanol synthesis reactor 5 contains 6.1% by volume methanol and 1.6% by volume water and delivers its sensible heat and part of its heat of condensation in the parallel-connected heat exchanger 4 and exhaust gas preheater 6 to the recycled gas and exhaust gas, respectively.

The exhaust gas preheater 6 may be connected parallel to and/or in series with the heat exchanger 4 so that the exhaust gas can be simply overheated, or re-overheated.

The product gas is further cooled in an air cooler 7 or in a final cooler 8 or only in a final cooler 8 to a temperature which depends on the coolant temperature and in the present case amounts to 45° C. The raw methanol which is condensed out is separated from the remaining gas in the methanol separator 11 and is removed from the process at 16. A major portion of the remaining gas is mixed with fresh gas and the cycle begins anew.

To prevent an enriching of non-reactants, part of the residual gas must be removed from the cycle. This part of the residual gas will be referred to as exhaust gas hereinafter.

It has the following composition in % by volume:

| | |
|---|---|
| $CO_2$ | 4.10 |
| CO | 2.43 |
| $H_2$ | 79.76 |
| $CH_4$ | 12.95 |
| $N_2$ | 0.30 |
| $CH_3OH$ | 0.43 |
| $H_2O$ | 0.03 |

The pressure may amount to between 25 and 150 bars, depending on the selected reaction pressure, and in the present case amounts to 80 bars. If fresh gas 1 is supplied at a rate of 361,115 standard m³/h, the reaction performed as stated above will result in a production of exhaust gas at a rate of 107,244 standard m³/h.

The exhaust gas is now heated to a temperature level between 50° and 265° C, in the present case to 200° C, in a flow path which is connected in series with and/or parallel to the product gas. This temperature level depends on the reaction pressure and the final reaction temperature. The flow of the exhaust gas in the exhaust conduit 12 and the exhaust gas preheater 6 results in a pressure loss so that the exhaust gas enters the expansion turbine 15 in the present case under a pressure of 76 bars. In the expansion turbine 15, the exhaust gas can be expanded to a pressure between 75 bars and 1 bar with performance of work. In the present case, the gas is expanded to a pressure of 3 bars, corresponding to an outlet temperature of 5° C, if the expansion turbine 15 has an efficiency of 72.5%. The energy produced in the expansion turbine 15 may drive a directly coupled machine or may be transformed into electric energy in a directly coupled generator.

The exhaust gas may be alternatively expanded in two stages. After the first stage the exhaust gas is indirectly returned to the cycle and is re-overheated. The electrical energy produced in the present case is calculated as follows.

| | |
|---|---|
| Exhaust gas rate | 107,244 standard m³/h |
| Enthalpy of exhaust gas, 76 bars, 200° C | 3396 kcal/kmole |
| Adiabatic expansion to 3 bars | 1380 kcal/kmole |
| Adiabatic enthalpy difference $\Delta h_{ad}$ | 2016 kcal/kmole |
| Assumed efficiency of turbine $\eta_T$ | 0.725 |
| Isentropic enthalpy difference $\Delta h_{is}$ | 1460 kcal/kmole |
| Turbine power $N_T = \frac{1460 \times 107{,}244}{860 \times 22.415}$ | 8122.48 kW |
| Assumed efficiency of generator $\eta_G$ | 0.98 |
| Power output of generator $N_G$ = 8122.48 × 0.98 = | 7960 kW |

EXAMPLE 2

Example 2 differs from Example 1 in that the exhaust gas is not heated in the cycle but is heated in a fired overheater. The overheater may be fired with part of the exhaust gas as well as with fossil fuels which are extraneous to the process. The exhaust gas may alternatively be heated by hot fluids, such as superheated steam.

The exhaust gas at a rate which becomes available under the same conditions may be heated to a temperature between 50° and 500° C in a fired overheater, in the present case preferably to 200° C. The exhaust gas is then expanded to 20 bars in the first expansion stage of the expansion turbine and is again supplied to the overheater for being re-overheated to 200° C. The gas is subsequently expanded further to 2 bars. The overheated exhaust gas may alternatively be expanded directly to the final pressure of 2 bars. Where the exhaust gas is re-overheated, the generator 14 produces an electric power of 10,539 kW.

The electric energy produced in this case is calculated as follows:

| High-pressure stage | |
|---|---|
| Exhaust gas rate | 107,244 standard m³/h |
| Enthalpy of exhaust gas, 76 bars, 200° C | 3396 kcal/kmole |
| Adiabatic expansion to 20 bars | 2340 kcal/kmole |
| Adiabatic enthalpy difference $\Delta h_{ad}$ | 1056 kcal/kmole |
| Assumed efficiency of turbine $\eta_T$ | 0.725 |
| Isentropic enthalpy difference $\Delta h_{is}$ | 766 kcal/kmole |
| Turbine Power $NT_1 = \frac{766 \times 107{,}244}{860 \times 22.415}$ | 4261.52 kW |
| Low-pressure stage | |
| Re-overheating | |
| Exhaust gas rate | 107,244 standard m³/h |
| Enthalpy of exhaust gas, 20 bars, 200° C | 3396 kcal/kmole |
| Adiabatic expansion to 2 bars | 1840 kcal/kmole |
| Adiabatic enthalpy difference $\Delta h_{ad}$ | 1556 kcal/kmole |
| Assumed efficiency of turbine $\eta_T$ | 0.75 |
| Isentropic enthalpy difference $\Delta h_{is}$ | 1167 kcal/kmole |
| Turbine power $NT_2 = \frac{1167 \times 107{,}244}{860 \times 22.415}$ | 6492.43 kW |
| $NT_1 + NT_2 =$ | 10753.94 kW |
| Assumed efficiency of generator $\eta_G$ | 0.98 |
| Power output of generator $N_G$ = 10753.94 × 0.98 = 10539 kW | |

What is claimed is:

1. Process of recovering energy from a residual gas from a catalytic synthesis of methanol, comprising the steps of:
   a. reacting a gaseous mixture having a temperature in the range of 190°–280° C and containing hydrogen and carbon oxides in a methanol synthesis zone in the presence of a catalyst at a pressure of 25–150 bars and producing a methanol containing product gas,
   b. cooling said product gas by indirect heat exchange,
   c. in a separation zone, separating methanol from the cooled product gas,
   d. withdrawing from said separation zone residual gas containing hydrogen, carbon oxides and methane and having a pressure of 25–150 bars,
   e. mixing a first partial stream of said residual gas and fresh synthesis gas and feeding the mixture into said catalytic synthesis of methanol, f. withdrawing a second partial stream of said residual gas and heating it to a temperature of 50°–500° C and g. feeding the heated second partial stream of step (f) to an expansion turbine for a partial expansion with the performance of work.

2. Process of claim 1, wherein the second partial stream according to step (f) is heated to a temperature of 50–265° C by indirect heat exchange with and in counterflow to the product gas from said methanol synthesis zone.

3. Process of claim 1, wherein the heated second partial stream of step (f) is expanded in two expansion stages and the gas from the first expansion stage is reheated to a temperature of 50°–500° C and fed into the second expansion stage.

4. Process of claim 3, wherein the gas expanded in the first expansion stage is reheated by using a part of the residual gas withdrawn in step (d) as a fuel.

5. Process of claim 1, wherein the ratio of the first partial stream of residual gas and fresh synthesis gas in the mixture of step (e) is 3:1.

* * * * *